United States Patent [19]

Lauterbach

[11] 4,370,106

[45] Jan. 25, 1983

[54] BEARING ASSEMBLY FOR HIGH SPEED SHAFT

[75] Inventor: Jerre F. Lauterbach, Columbus, Ind.

[73] Assignee: Cummins Engine Company, Columbus, Ind.

[21] Appl. No.: 90,346

[22] Filed: Nov. 1, 1979

Related U.S. Application Data

[63] Continuation-in-part of Ser. No. 18,926, Mar. 9, 1979, abandoned.

[51] Int. Cl.³ .................. F04B 17/00; F04B 35/00; F16C 21/00
[52] U.S. Cl. ..................... 417/407; 308/DIG. 15; 384/126
[58] Field of Search .......... 415/110, 112, 113, 170 R; 417/405, 406, 407; 308/9, 15, 35, 100, 121, 123, 174, 196, 237 A, DIG. 9, DIG. 15

[56] References Cited

U.S. PATENT DOCUMENTS

| 1,210,516 | 1/1917 | Morris | 308/196 |
|---|---|---|---|
| 1,374,988 | 4/1921 | Cooper | 308/196 |
| 2,049,343 | 7/1936 | Warren | 308/9 |
| 2,664,323 | 12/1953 | Alford | 308/DIG. 15 |
| 2,930,662 | 3/1960 | Henstridge | 415/170 R |
| 3,043,636 | 7/1962 | MacInnes et al. | 308/DIG. 15 |
| 3,056,634 | 10/1962 | Woollenweber, Jr. et al. | 308/DIG. 15 |
| 3,411,706 | 11/1968 | Woollenweber, Jr. et al. | 417/407 |
| 3,637,272 | 1/1972 | Christiansen | 308/35 |

FOREIGN PATENT DOCUMENTS

| 460937 | 2/1937 | United Kingdom . |
| 704761 | 3/1954 | United Kingdom ......... 308/DIG. 9 |
| 872021 | 7/1961 | United Kingdom . |
| 1134038 | 11/1968 | United Kingdom . |
| 1236399 | 6/1971 | United Kingdom . |
| 1394931 | 5/1975 | United Kingdom . |
| 1507107 | 4/1978 | United Kingdom . |
| 1557601 | 12/1979 | United Kingdom . |

Primary Examiner—Carlton R. Croyle
Assistant Examiner—Jeffrey A. Simenauer
Attorney, Agent, or Firm—Merriam, Marshall & Bicknell

[57] ABSTRACT

This disclosure relates to a bearing assembly for a high speed rotating shaft, such as a turbocharger shaft. The bearing assembly includes a sleeve bearing and a ball bearing. The sleeve bearing carries the radial load adjacent one end of the shaft, and the ball bearing carries the radial load adjacent the other end of the shaft. The shaft is subject to thrust loads in either axial direction, and the ball bearing also carries the thrust load in at least one direction.

21 Claims, 7 Drawing Figures

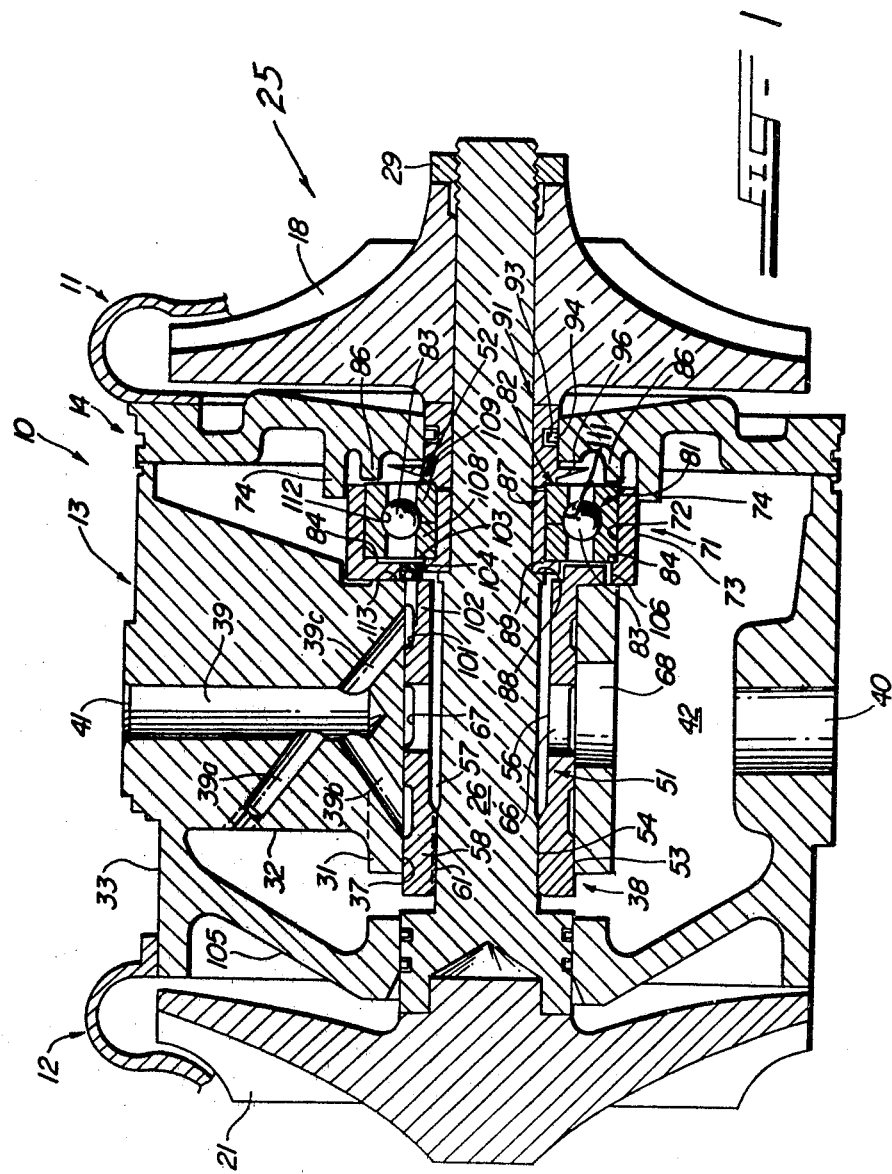

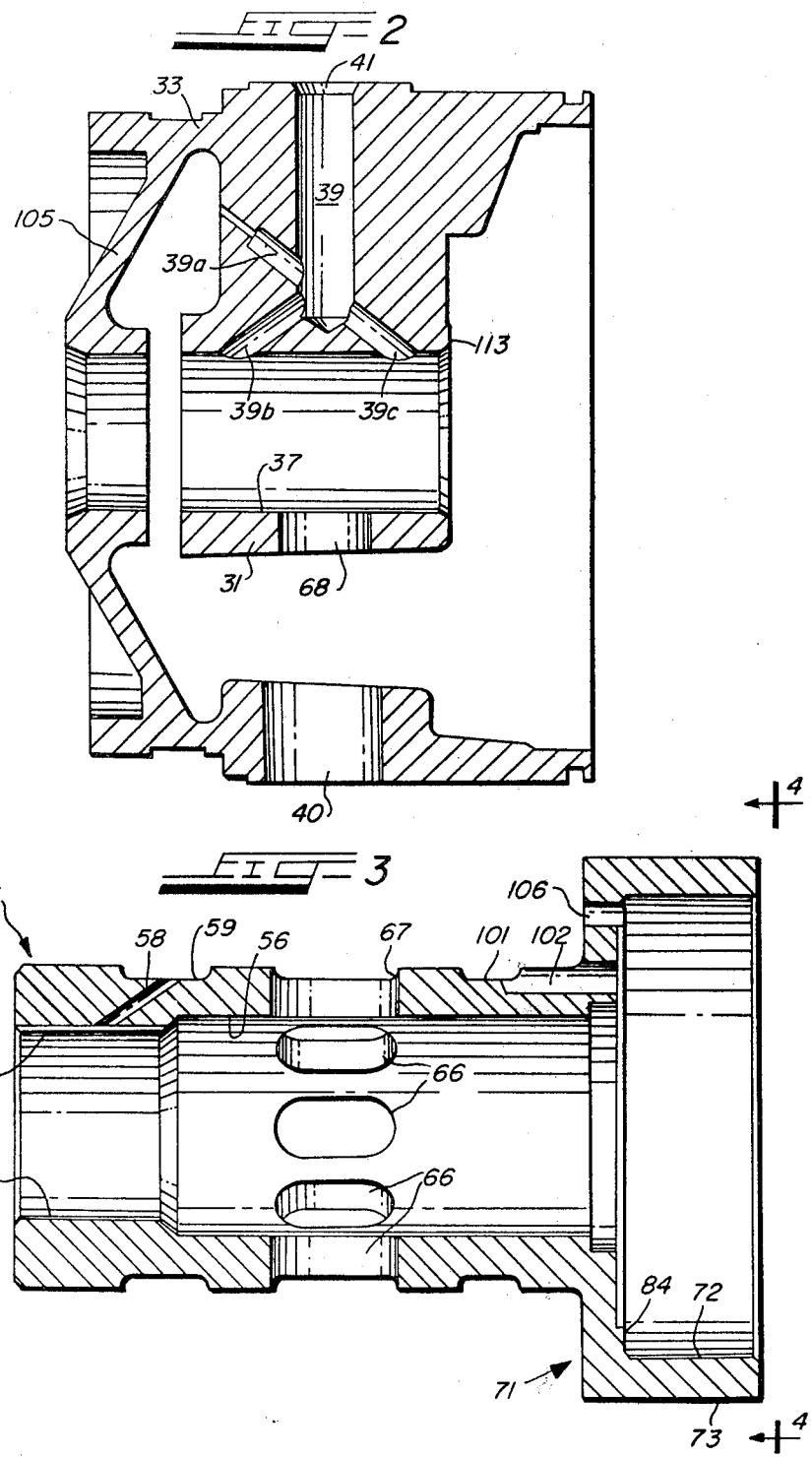

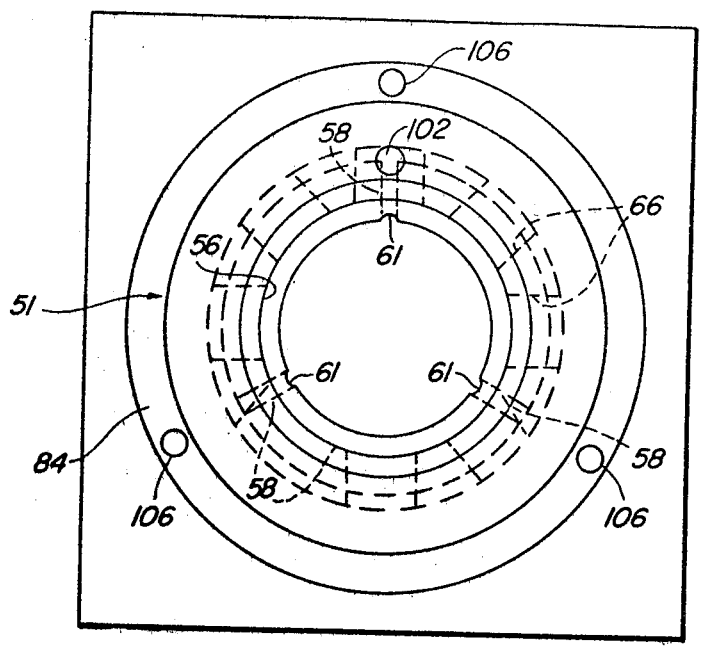
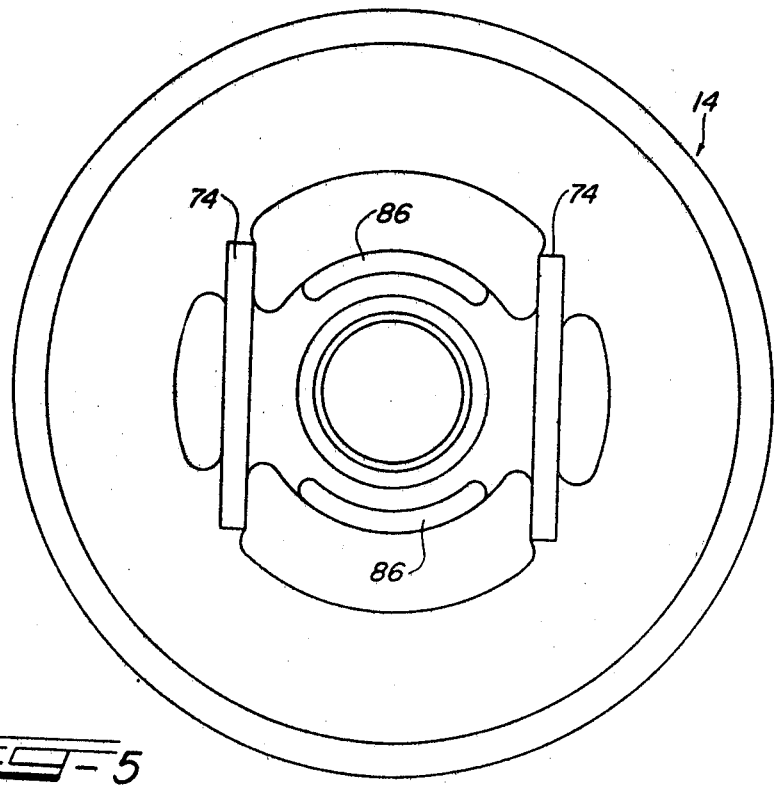

BEARING ASSEMBLY FOR HIGH SPEED SHAFT

This is a continuation-in-part of application Ser. No. 18,926, filed Mar. 9, 1979 now abandoned.

The bearings for a turbocharger rotor of an internal combustion engine present very difficult technical problems. These problems arise from the fact that the rotor shaft operates at high speeds, in the range of 125,000 RPM, and that the shaft is subjected to radial loads and to axial thrust loads. The thrust load is mainly in one direction but in some circumstances an axial load can exist in the opposite direction. Further, the turbine end of the shaft can become very hot, and the heat can break down the bearing lubricant and cause changes in the properties of the bearing materials. Still further, the shaft and the rotor tend to move around the mass center, which is usually not the geometric center, and this is particularly true at certain critical (harmonic) speeds. Consequently the axis or geometric center line of the rotor swings in a circular path as the rotor turns on its axis and this swinging movement presents additional difficult problems.

Bearings have of course been provided which attempt to meet these specialized problems. For example, U.S. Pat. No. 3,056,634 discloses a turbocharger including a floating sleeve bearing. A film of lubricant exists between the shaft and sleeve bearing to support the rotative movement of the shaft, and another film exists between the bearing and the bearing support or housing which allows the bearing to "float" in order to accommodate the swinging movement. A separate sliding thrust bearing is also provided at one end of the sleeve bearing. U.S. Pat. No. 3,043,636 also discloses a floating sleeve bearing, but in this patent, the sliding thrust bearing is integral with the sleeve bearing. While the bearings shown in these patents, and others of the prior art, are operable, they have disadvantages such as excessive power losses which arise mainly in the thrust bearing because the radial load is normally light.

Frictionless bearings, such as ball and roller bearings, have lower losses than hydrodynamic sleeve bearings but have not been used in turbochargers heretofore. If such a bearing were used at the turbine end, the heat would produce low life of the bearing or would require a high cost bearing. Further when operating at light radial loads and high speeds, the balls or rollers tend to skid or slide instead of roll, and such operation can quickly deteriorate the bearings.

It is a general object of the present invention to provide an improved bearing assembly which has a relatively long life, low cost, and low power losses. The low power losses in turn result in high efficiency and a rapid response to changing engine operation.

Apparatus in accordance with the present invention comprises a bearing assembly for supporting a rotor in a housing, the assembly including a hydrodynamic sleeve bearing and a ball bearing. The sleeve bearing supports the radial loads at the turbine end of the rotor shaft and the ball bearing supports the radial loads at the compressor end of the rotor shaft. The ball bearing further supports the main axial thrust load which is normally in the direction from the turbine end of the rotor toward the compressor end. The ball bearing also supports the rotor thrust load in the opposite direction. The thrust load which is essentially always present on the bearing further prevents skidding of the balls at light radial loads. The assembly may further include means forming a solid film lubricant between the rotor and the housing.

The foregoing and other objectives and advantages of the present invention will become more apparent from the following detailed description taken in conjunction with the accompanying figures of the drawings, wherein:

FIG. 1 is a sectional view of a turbocharger including a bearing assembly constructed in accordance with the present invention;

FIG. 2 is a sectional view of a bearing support of the turbocharger;

FIG. 3 is a sectional view of the bearing assembly;

FIG. 4 is a view taken on the line 4—4 of FIG. 3;

FIG. 5 is an elevational view of another part of the turbocharger;

Figure 6:
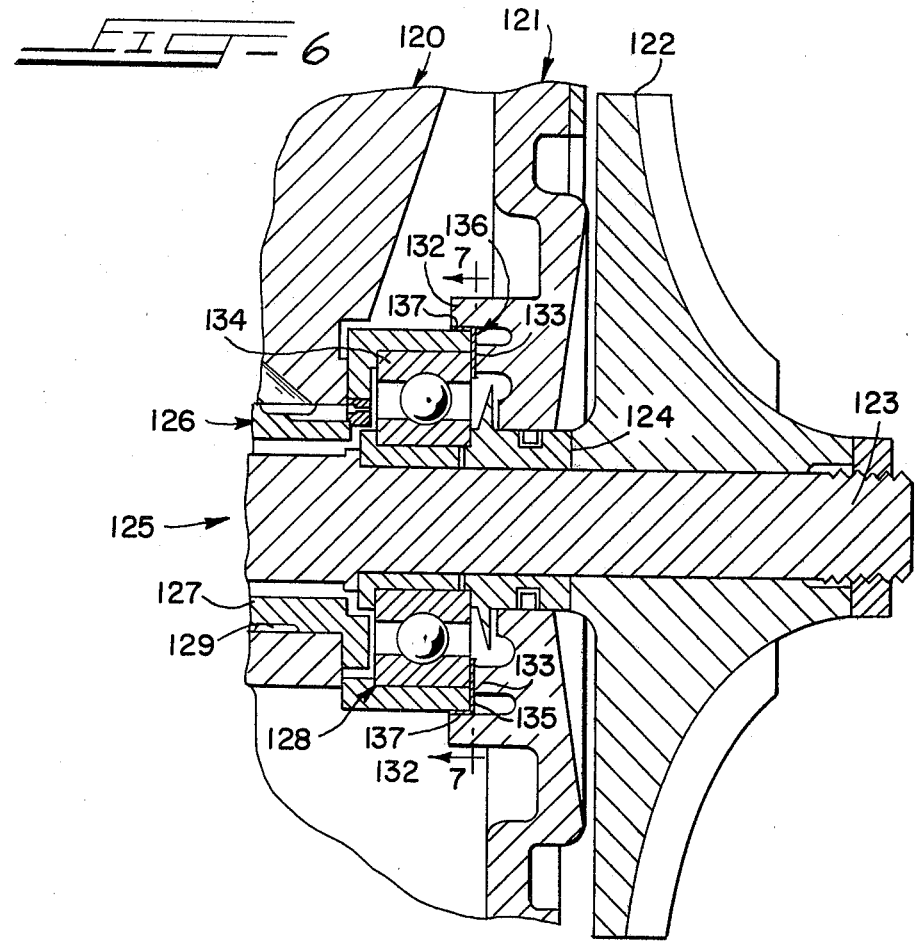
FIG. 6 is a fragmentary sectional view showing an alternative form of the invention.

With reference to FIG. 1 of the drawings, a turbocharger including a bearing assembly constructed in accordance with the present invention comprises a housing 10 formed by a compressor casing 11, a turbine casing 12, and a central bearing support 13. An oil seal plate 14 is mounted between the support 13 and the casing 11. The support 13, the plate 14 and the casings are secured together by suitable fasteners (not shown). The compressor casing 11 receives a compressor wheel 18, and similarly, the turbine casing 12 surrounds a turbine wheel 21. The two wheels 18 and 21 are secured to opposite ends of a rotatable shaft 26, the parts 18, 21 and 26 forming a turbine rotor 25. The turbine wheel 21 is rigidly secured to the left-hand end (as seen in FIG. 1), and the compressor wheel 18 is positioned on the shaft 26 and secured to it by a nut 29.

The bearing support or housing 13 includes a generally tubular part 31 that is supported by a plurality of radial struts 32. The part 31 has a bore 37 formed in it, that receives a bearing assembly 38 which rotatably supports the shaft 26. A lubricant channel 39 is formed in one of the struts 32 of the bearing housing 13, and at its radially outer end, the channel 39 forms a lubricant inlet opening 41. The support 13 has a generally tubular outer wall 33 which has the opening 41 formed in it. The outer wall 33 further has a lubricant outlet 40 formed in its lower side. During operation of the engine and the turbocharger, the lubricant of the engine lubricant system is pumped under pressure into the inlet opening 41 and the channel 39, and the lubricant flows through branches 39a, 39b and 39c of the channel 39 in order to lubricate the parts of the bearing assembly 38 as will be described, and the lubricant then drops to a lower chamber 42 of the housing 13, and a tube (not shown) connected to the outlet 40 carries the lubricant to the sump of the lubricant system.

The bearing assembly 38 comprises a sleeve 51 and a ball bearing 52. The bore 37 of the bearing housing 13 is cylindrical and it receives the cylindrical outer surface 53 of the sleeve 51. The sleeve 51 extends into close proximity with the outer surface of shaft 26 only at the turbine wheel 21 end, and forms a hydrodynamic bearing portion 54. With the exception of the portion 54, the inner side of the sleeve 51 is recessed as indicated at 56 to provide a clearance space 57. A plurality of slanting or diagonal holes 58 (FIGS. 1 and 3) are formed through the wall of the sleeve 51, and the outer ends of the holes 58 are located in an annular groove 59 in the outer surface of the sleeve 51. The groove 59 is aligned with the channel branch 39b as shown in FIG. 1. An axial groove 61 is formed in the bearing 54 at the inner end of each hole 58. Consequently during operation of the turbocharger, the lubricant flows through the branch 39b, the groove 59, the holes 58 the grooves 61, and axially between the shaft 26 and the portion 54 of the bearing. This lubricant creates a lubricant film between the shaft and the bearing as is well known to those skilled in the bearing art.

Approximately midway along the length of the sleeve 51 is provided a plurality of radial holes 66 and an annular groove 67 in the outer surface. The holes 66 permit the lubricant flowing into the clearance space 57 to flow out of the bearing assembly through the groove 67 and a hole 68 (FIG. 1) formed in the lower side of the bearing housing 13.

At the compressor end of the bearing assembly 38, a thrust bearing support portion 71 is formed on the sleeve 51. As best shown in FIG. 4, the portion 71 is radially enlarged and it has a circular inner opening 72. The bearing assembly 38 is prevented from rotating in the bearing housing 13, and in the present example this is accomplished by providing the outer side 73 of the enlarged portion 71 with an out-of-round configuration and by providing the plate 14 with flanges 74 that engage the side 73. As shown in FIGS. 1 and 4, the oil seal plate 14 has at least two axially extending flanges 74 which overlie the outer surface of at least part of the outer side 73. Since the oil seal plate 14 is a stationary part of the turbocharger housing, the flanges 74 prevent the bearing assembly from turning. There is, however, a slight clearance between the outer side 73 and the flanges 74 so that some radial movement of the bearing assembly is permitted. As mentioned, instead of being square, the portion 71 could have a different out-of-round shape, or an entirely different type of device could be provided to prevent rotation, such as a pin and mating hole arrangement.

The ball bearing 52 is mounted in the circular opening 72 of the portion 71, as shown in FIG. 1. The bearing 52 includes circular outer and inner races 81 and 82, and a plurality of balls 83 mounted in a cage. The outer race 81 is secured to the portion 71 as by a press fit in the opening 72, and the turbine side of the outer race 81 engages the bottom wall 84 of the opening 72. The oil plate 14 includes another plurality of axial flanges 86 which are closely adjacent the compressor side of the outer race 81. Consequently, the outer ball bearing race 81 is held against rotation and against axial movement in both directions.

In the specific example illustrated, the oil plate 14 is formed with the two straight flanges 74 (FIG. 5) spaced 180° apart, and with the two arcuate flanges 86 spaced radially inwardly and spaced by an angle of 90° from the flanges 74.

The bearing assembly 38 preferably also includes a sleeve or annular spacer 87 that is press fit into the inner race of the bearing 52 and holds it assembled as will be explained. The annular spacer 87 is positioned on the shaft 26. The turbine end of the spacer 87 abuts a radial shoulder 88 formed on the shaft 26, and this end of the spacer has a radially outwardly extending flange 89 formed on it, which fits between the shoulder 88 and the inner race 82. A tubular sleeve 91 is positioned around the shaft 26 between the ball bearing 52 and the compressor wheel 18, and the sleeve 91 abuts the inner race 82. Consequently, when the nut 29 is tightened on the shaft 26, the spacer 87 and the inner race 82 are tightly secured between the shoulder 88 and the sleeve 91.

The sleeve 91 fits snugly on the shaft 26 and it is radially aligned with the oil plate 14. An annular groove 93 in the outer side of the sleeve 91 receives a sealing ring 94 that prevents leakage of the lubricant. An oil slinger 96 on the outer side of the sleeve 91 throws the lubricant away from the seal area.

The branch 39c of the lubricant channel 39 is connected to supply lubricant to the ball bearing 52. The branch 39c angles from the radial channel 39 toward compressor end of the sleeve 51. An annular groove 101 in the outer surface of the sleeve 51 communicates with the channel branch 39c, and an axial passage 102 extends from the groove 102 to the bottom wall 84 of the opening 72.

An insert 103 is preferably mounted in the passage 102, which has a smaller diameter hole 104 in it. The hole 104 is generally aligned with the balls 83, and during operation, a jet of lubricant leaves the hole 104 and is sprayed on the balls 83. A plurality of angularly spaced holes 106 are also formed through the wall of the portion 71 for draining the lubricant from the opening 72.

The third branch 39a of the channel 39 is angled radially outwardly and toward the turbine side of the bearing housing, and it discharges a jet of lubricant against the adjacent wall 105 of the bearing support in order to cool the turbine side of the turbocharger.

During operation of the turbocharger, the axial thrust load on the shaft 26 is normally in the direction of the compressor wheel 18 but in some circumstances the thrust load may reverse direction. The ball bearing 52 may be designed to withstand the thrust load in either direction by splitting the outer race 81, the inner race 82, or both races. In the specific example illustrated, only the inner race 82 is split and it comprises two sections 108 and 109. The two sections are tightly clamped together when assembled, as shown, between the flange 89 and the sleeve 91. Prior to assembly of the bearing 52 in the turbocharger, the two sections 108 and 109 are held in assembly by the sleeve 91. The inner corner 111 of each section has an arcuate cutout which receives the balls 83. The outer race 81 has an arcuate annular groove 112 that also receives the balls.

By splitting the inner race 82 as shown, it is possible to construct the ball bearing to withstand relatively high axial loads in both directions and also withstand radial loads. To assemble the ball bearing 52, the balls 83 and the ball cage are first assembled with the outer race 81, there being enough play between the balls and the cage to enable the balls to be pressed into the groove 112. The two sections 108 and 109 of the inner race 82 are then assembled on opposite sides of the balls. This arrangement permits the grooves 111 and 112 to have relatively large and strong radial shoulders which are capable of withstanding axial loads in either direction.

During operation of the turbocharger, the lubricant flows into the channel 39 and through the branches 39a, 39b and 39c, and the shaft 26, the wheels 18 and 21, the sleeve 91, the spacer 87, and the inner race of the ball bearing 52 rotate. The lubricant flowing through the branch 39b, the holes 58 and the grooves 61 form a film between the sleeve bearing 51 and the shaft, and the bearing portion 54 of the sleeve supports the radial load at the turbine end of the shaft 26. The bearing assembly 38 is also resiliently mounted in the support 13. While various resilient mounts may be provided, such as a thin layer of resilient material or a thin film of lubricant, in the present specific example a thin lubricant film is preferred. The lubricant flows through the channel 39, the branches 39b and 39c, and into the grooves 59 and 101 and it forms a film between the sleeve 51 and the bore 37, so that the sleeve 51 floats in the bearing housing. When the rapidly rotating rotor 25 goes through a critical speed, the rotor tends to swing about its mass center. The oil film between the assembly 38 and the support 13 permits such swinging movement because it forms a resilient or semi-rigid support, but the film also provides a viscous damping action and it isolates the bearing assembly from the support 13. The bearing support could be arranged to securely hold the bearing assembly and thereby prevent such swinging movement, but this would result in high forces on the parts particularly at the critical speeds, and failure would be the eventual result. The resilient or floating mounting thus permits the rotor to pass through the critical speeds without producing the high forces. The bearing assembly is, however, prevented from turning by the square sides 73 and the flanges 74.

The lubricant also, of course, flows through the passage 102 and lubricates the ball bearing 52, and the bearing 52 supports the radial load at the compressor end of the shaft 26. The radial load path at this end is through the spacer 87, the ball bearing 52, the bearing support portion 71 and to the bore 37 adjacent the support portion 71.

With an axial load toward the compressor wheel 18, the load path is through the shoulder or ridge 88, the flange 89 of the spacer 87, the section 108 of the inner race, the balls 83, the outer race 81, and the end surfaces of the flanges 86. With an axial load in the other direction, the load path is from the wheel 18 and the sleeve 91, the section 109 of the inner race the balls 83, the outer race 81, the bottom wall 84 of the bearing support portion 71, and to the adjacent radial surface 113 of the bearing housing 13. There must, however be some axial clearance to obtain the radial damping action.

The direction of the thrust on the rotor 25 is normally toward the right as seen in FIG. 1, and this thrust load is supported by the oil seal plate 14. The load path is from the rotor 25, to the bearing assembly and then to the arcuate flanges 86. Thus, the right-hand surface, as seen in FIG. 1, of the outer race 81 of the ball bearing normally bears against the left-hand end surface of the flanges 86. As previously mentioned, the bearing assembly is allowed to swing about its geometric center because of its floating mounting arrangement, and this movement combined with the thrust load may cause galling and fretting at the engaging surfaces of the ball bearing 52 and the flanges 86. Failures due to such galling and fretting may be prevented by providing a large engaging surface area between the bearing 52 and the flanges 86 and/or by choosing materials for these parts which will withstand galling and fretting in these conditions.

Figure 7:
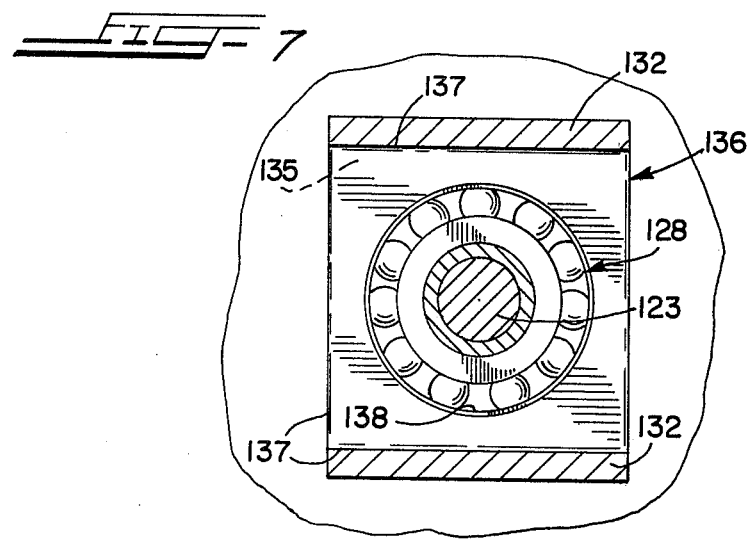
FIG. 7 is a fragmentary sectional view taken on the line 7—7 of FIG. 6.

FIGS. 6 and 7 illustrate an alternative and preferred form of the invention, including means for preventing galling and fretting as described above. The apparatus shown in FIGS. 6 and 7 includes a central bearing support 120, an oil seal plate 121, a compressor wheel 122, a rotor shaft 123, and a sleeve 124, these parts being the same as the corresponding parts 13, 14, 18, 26 and 91 shown in FIGS. 1 to 5. There is further provided a bearing assembly 126 including a sleeve 127 and a ball bearing 128, the sleeve 127 being resiliently mounted in a bore 129 of the support 120 by a film of lubricant as previously described. The sleeve 127 and the ball bearing 128 support the shaft 123, the lubricant flowing through these parts similarly to the arrangement shown in FIGS. 1 to 5.

Means is provided to prevent the bearing assembly from rotating, such means again taking the form of an out-of-round outer configuration of the outer surface 131 of the bearing assembly 126 and flanges 132 on the oil seal plate 121. The axial thrust load of the rotor 125 is normally toward the right as seen in FIG. 6, and arcuate flanges 133 on the seal plate 121 are axially aligned with the outer race 134 of the ball bearing 128 and with the right-hand surface 135 of the sleeve 127, and they support the thrust load.

To prevent galling and fretting of the adjacent thrust bearing surfaces of the bearing assembly and the flanges 133, a solid film lubricant 136 is provided between the adjoining surfaces. The film lubricant 136 comprises a thin film or sheet of Teflon that is impregnated with fiber glass. It preferably forms part of the bearing assembly 126, and it substantially covers the right-hand end surface of the sleeve 127 and the outer race 134. As previously mentioned, in the specific examples of the invention shown and described, the outer surface 131 of the sleeve 127 is square, as shown in FIG. 7, and the outer configuration of the film 136 is also square. The outer edge portions of the film 136 are bent to extend axially as indicated in FIG. 6 by the numeral 137, and the edge portions 137 extend between the outer surface 131 of the sleeve and the flange 132. The film 136 has a central circular opening 138 formed in it which extends to the outer periphery of the balls of the bearing 128, thus also extending over the outer race 134 of the bearing 128. The film 136 may be secured to the bearing assembly or to the oil seal plate as by a suitable adhesive. The right-hand end surfaces of the sleeve 127 and the outer race 134 are preferably flush in order to increase the bearing surface area for the thrust load. The film 136 is particularly advantageous because it is somewhat compressible and thus is able to distribute the thrust load over the end surfaces of the sleeve and the outer race.

During operation of the turbocharger, the fluid lubricant from the channels formed in the bearing support 120 and in the bearing assembly 126 flows around the film 136. The film 136 is compressed between the bearing assembly and the flanges 133 due to the axial thrust loading on the rotor 125, and the rotor also moves radially, but the solid film lubricant 136 and the fluid lubricant between the bearing assembly and the flanges 132 and 133 prevents galling and fretting of the adjoining metal surfaces.

While a thin film similar to the film 136 has been provided in prior art turbochargers, none has been provided with a bearing assembly and oil seal plate flanges as disclosed herein. The film 136 extends across the juncture of the sleeve 127 and the outer race 134 and, being compressible, it evenly distributes the thrust load and increases the thrust load area. Further, the edge portions 137 of the film 136 extend between the surface 131 of the sleeve 127 and the flanges 132, and prevent any galling of these surfaces.

It will be apparent from the foregoing that an improved bearing assembly has been provided. The thrust load, which is the source of most bearing friction losses in prior art turbochargers, is carried by a low loss antifriction bearing which also carries the radial load at the compressor end of the shaft. The ball bearing is spaced away from the hot turbine, thereby preventing lubrication problems. Further, a continuous jet of lubricant is sprayed on the ball bearing to cool and lubricate it. Since the ball bearing is maintained in a relatively cool environment, a bearing containing lower cost materials and heat treatment may be used and nevertheless have a long life. The axial load also prevents skidding of the balls during low radial loads. To ensure against galling and fretting of metal parts due to the swinging movement combined with the axial load, a solid film lubricant may be provided between the metal parts. The use of a split race in the ball bearing permits the construction of a ball bearing capable of withstanding relatively large thrust loads in either direction. Due to the low power losses of the ball bearing, the efficiency of the turbocharger is high and it is able to respond quickly to increased air flow requirements. The bearing assembly may be part of the original equipment of a turbocharger, or an assembly may be used as a replacement for the conventional bearing of a turbocharger. By providing a hydrodynamic sleeve bearing and a ball bearing as part of a single assembly or unit, it is possible to obtain close bearing alignment and to obtain the proper clearances which are necessary in a bearing designed for high temperature, high speed operation.

I claim:

1. A bearing assembly for supporting a high speed rotating shaft in a non rotating housing, the housing having a bore formed therein, comprising a generally tubular sleeve positioned in said bore, resilient mount means in said bore between said sleeve and said housing for floatingly supporting said sleeve in said housing, said sleeve having a circular opening therethrough that is adapted to receive the shaft for rotation therein, hydrodynamic bearing means adjacent one end of said sleeve and on the inner side thereof for supporting radial loads from said shaft at said one end, an anti-friction bearing at the other end of said sleeve, bearing support means on said sleeve for supporting said anti-friction bearing, said anti-friction bearing supporting radial loads from said shaft at said other end, and means on said anti-friction bearing and said bearing support means adapted to engage said housing for supporting axial thrust loads in both directions.

2. An assembly as in claim 1, wherein said sleeve has lubricant flow passages formed therein leading to said bearing support means for carrying lubricant to said anti-friction bearing.

3. An assembly as in claim 2, wherein said flow passages include means forming a jet of lubricant and spraying said jet into said anti-friction bearing.

4. An assembly as in claim 1, wherein said sleeve and said hydrodynamic bearing means are formed integrally, and said sleeve includes passages therein for carrying lubricant to said bearing means.

5. An assembly as in claim 1, wherein said bearing support means includes a circular opening, and said anti-friction bearing is mounted in said opening.

6. An assembly as in claim 1, said assembly further including means on said assembly cooperable with said housing to prevent rotation of said sleeve.

7. An assembly as in claim 6, wherein said last named means comprises an out-of-round outer configuration which is adapted to be engaged by said housing in order to prevent rotation of said sleeve.

8. An assembly as in claim 1, wherein said anti-friction bearing includes outer and inner races and a plurality of balls between said races, at least one of said races being split.

9. An assembly as in claim 8, wherein said inner race is split.

10. An assembly as in claim 8, wherein said inner race is split and includes two sections, and said bearing assembly further comprises a sleeve that is press fit into said two sections and thereby holds said two sections in assembled relation.

11. An assembly as in claim 8, wherein said anti-friction bearing has relatively high radial shoulders and is adapted to withstand relatively large axial thrust loads in either direction.

12. An assembly as in claim 6, and further including solid film lubricant means between said bearing assembly and the bearing housing.

13. In a turbocharger for an internal combustion engine, the improvement comprising a bearing housing having a shaft bore formed therethrough, a shaft extending through said bore and having a turbine end adapted to be secured to a turbine wheel and a compressor end adapted to be secured to a compressor wheel, a bearing assembly mounted in said bore and supporting the radial and axial thrust loads of said wheels, said assembly comprising a sleeve, resilient mount means connecting said sleeve to said housing for floatingly supporting said sleeve in said housing, hydrodynamic bearing means on said sleeve adjacent said turbine end of the shaft for supporting said radial load, bearing support means on said sleeve adjacent said compressor end of the shaft, anti-friction bearing means mounted in said bearing support means and connected to said shaft, said anti-friction bearing means supporting said radial load at said compressor end, and means operatively connecting said anti-friction bearing means and said bearing housing for supporting axial thrust from said shaft in both directions.

14. Apparatus as in claim 13, wherein said anti-friction bearing means includes inner and outer races and a plurality of balls, said races having relatively high shoulders and thereby being able to withstand high axial thrust loads.

15. Apparatus as in claim 14, wherein said anti-friction bearing means is able to withstand axial thrust loads in either direction, and at least one of said races is split.

16. Apparatus as in claim 15, wherein said inner race is split and comprises two sections, and said two sections are clamped tightly and are mounted between a shoulder formed on said shaft and said compressor wheel.

17. Apparatus as in claim 13, wherein said bearing housing and said sleeve have a plurality of lubricant flow passages formed therein for carrying lubricant to said hydrodynamic bearing means and to said anti-friction bearing means.

18. Apparatus as in claim 13, wherein said bearing assembly further includes a sleeve between said anti-friction bearing means and said shaft, said sleeve being attached to said anti-friction bearing means.

19. Apparatus as in claim 16, wherein said bearing assembly further includes a sleeve between said inner race and said shaft and attached to said two sections.

20. Apparatus as in claim 13, wherein said resilient means comprises a lubricant film.

21. In a turbocharger for an internal combustion engine, the improvement comprising a bearing housing having a shaft bore formed therethrough, a shaft extending through said bore and having a turbine end adapted to be secured to a turbine wheel and a compressor end adapted to be secured to a compressor wheel, a bearing assembly mounted in said bore and supporting the radial load of said shaft, said assembly comprising a sleeve, means for introducing a fluid between said housing and said sleeve for floating said sleeve in said bore, means connecting said sleeve with said housing for preventing rotation of said sleeve in said bore, hydrodynamic bearing means on said sleeve adjacent one end of the shaft for supporting said radial load of the shaft at said one end, bearing support means on said sleeve adjacent the other end of the shaft, and anti-friction bearing means mounted in said bearing support means and connected to said shaft, for supporting radial load at said other end of the shaft, and thrust means operatively connecting said anti-friction bearing means and said sleeve with said bearing housing for transferring thrust loads in both axial directions from said shaft, through said anti-friction bearing means, to said bearing housing.

* * * * *